United States Patent
Yada et al.

(10) Patent No.: US 6,170,219 B1
(45) Date of Patent: Jan. 9, 2001

(54) TRIM MEMBER MOUNTED ON A PANEL FLANGE AND A METHOD OF MOUNTING THEREON

(75) Inventors: Yukihiko Yada; Takeaki Niwa, both of Obu (JP)

(73) Assignee: Tokai Kogyo Kabushiki Kaisha, Obu (JP)

(*) Notice: Under 35 U.S.C. 154(b), the term of this patent shall be extended for 0 days.

(21) Appl. No.: 09/448,594

(22) Filed: Nov. 24, 1999

Related U.S. Application Data

(60) Continuation of application No. 08/661,672, filed on Jun. 11, 1996, now abandoned, which is a division of application No. 08/416,707, filed on Apr. 17, 1995, now Pat. No. 5,558,828.

(30) Foreign Application Priority Data

Aug. 23, 1993 (JP) .................................................... 5-207707
Jun. 2, 1994 (JP) .................................................... 6-121457

(51) Int. Cl.⁷ .............................. B60J 10/00; E04F 19/02
(52) U.S. Cl. ...................... 52/716.5; 52/716.1; 52/716.8; 52/800.12; 296/146.9
(58) Field of Search ............................... 52/716.1, 716.5, 52/716.6, 716.8, 717.03, 717.05, 800.1, 800.12; 49/475.1, 490.1, 499.1; 296/93, 146.9, 146.15; 428/31, 122

(56) References Cited

U.S. PATENT DOCUMENTS

| | | | |
|---|---|---|---|
| 2,166,798 | * 7/1939 | Côté | 52/717.05 X |
| 2,293,252 | 8/1942 | Foster et al. . | |
| 2,564,386 | * 8/1951 | Webb | 52/717.05 X |
| 2,794,757 | * 6/1957 | Bright | 52/716.8 X |
| 2,954,310 | * 9/1960 | Truesdell et al. | 52/717.05 X |
| 3,110,066 | * 11/1963 | Ward et al. | 52/717.05 X |
| 3,338,015 | * 8/1967 | Hoverman, Jr. | 52/717.05 X |
| 3,363,364 | * 1/1968 | Cadiou | 52/716.5 X |
| 3,491,176 | 1/1970 | Wahlstrom . | |
| 4,519,962 | 5/1985 | Schlienkamp . | |
| 4,850,176 | * 7/1989 | Munsey et al. | 52/717.05 X |
| 4,859,391 | 8/1989 | Jackson . | |
| 5,021,279 | * 6/1991 | Whitener | 52/717.03 X |
| 5,362,428 | 11/1994 | Tsujino et al. . | |
| 5,385,703 | 1/1995 | Shanok et al. . | |
| 5,558,828 | * 9/1996 | Yada et al. | 264/252 |

FOREIGN PATENT DOCUMENTS

| | | |
|---|---|---|
| 0369181 | 5/1990 | (EP) . |
| 0493068 | 7/1992 | (EP) . |
| 4151225 | 5/1992 | (JP) . |

\* cited by examiner

*Primary Examiner*—Christopher T. Kent
*Assistant Examiner*—Kevin D. Wilkens
(74) *Attorney, Agent, or Firm*—Dennison, Scheiner, Schultz & Wakeman

(57) ABSTRACT

A flange of a panel is inserted into an extrusion port of an extrusion molding die through an insertion slit, which opens laterally of the extrusion port, to thereby form a molding space that corresponds to a trim member between the extrusion port and the flange. A material for forming the trim member is extruded forwardly of the extrusion port through the molding space. The die and the flange are moved relative to each other while adjusting the insertion depth of the flange into the extrusion port so that the distance between a reference on the panel and the trim member is maintained at a desired distance. Thus, a trim member is extrusion molded on the edge of the flange of the panel and is mounted thereon simultaneously, thereby accurately mounting the trim member on the in a desired outer shape.

10 Claims, 9 Drawing Sheets

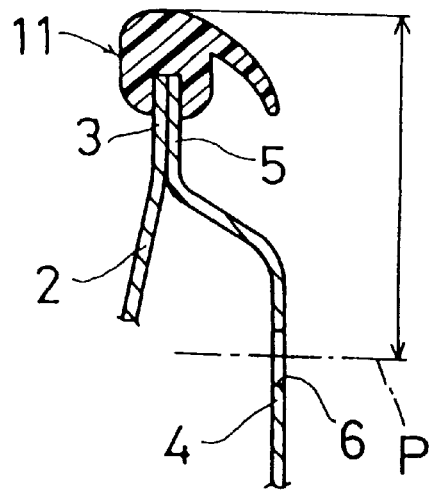
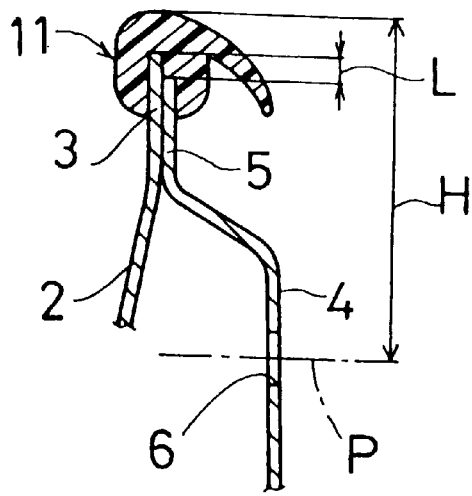
FIG.4(A)     FIG.4(B)
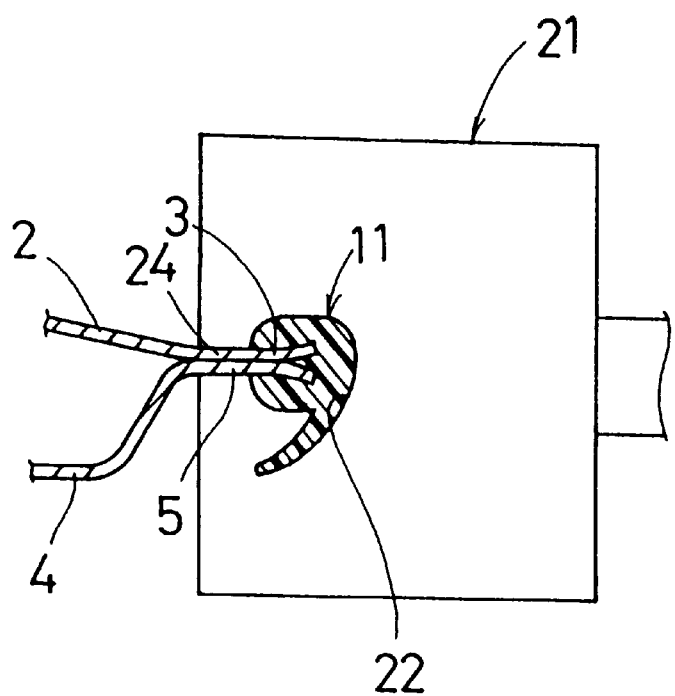
FIG.5

TRIM MEMBER MOUNTED ON A PANEL FLANGE AND A METHOD OF MOUNTING THEREON

This application is a continuation of 08/661,672 filing date Jun. 11, 1996 now abandoned which is a division of application Ser. No. 08/416,707, filing date Apr. 17, 1995 now U.S. Pat. No. 5,558,828.

BACKGROUND OF THE INVENTION

1. Technical Field

The present invention relates to a panel for a vehicle, such as a door panel or a panel that forms a wheel arch section, having a trim member and to a method of mounting the trim member on a flange of the panel.

2. Description of the Related Art

In a known door panel 1' for a vehicle, as shown in FIG. 8, a first flange 3' is formed on the upper edge of an inner panel 2' and a second flange 5' is formed on the upper edge of an outer panel 4' are joined by spot welding 7'. As shown in FIGS. 9(A) and 9(B), a trim member 11' (also known as a weather-strip, a molding or a welt) is mounted to cover the edges (upper ends) of the joined first and second flanges 3' and 5' by inserting the flanges 3' and 5' into an insertion groove formed in the trim member 11'.

Such a trim member 11' is disclosed in Japanese Laid-Open Patent Publication No. 2-68240, for example.

When the first flange 3' of the inner panel 2' is joined to the second flange 5' of the outer panel 4', the joined flanges 3' and 5' are sometimes joined with their positions shifted in a vertical direction, as shown in FIG. 8. The joined flanges 3' and 5' also may sometimes be joined with their upper ends partially separated, as shown in FIG. 10.

As shown in FIG. 9(A), a distance H' exists between a reference position P of the outer panel 4' and the upper edge of the trim member 11'. If the first and the second flanges 3' and 5' are joined with their positions shifted in the vertical direction at the mounting position, as shown in FIG. 9(B) (i.e., where the upper ends; of the joined flanges 3' and 5' are inserted into the trim member 11'), the distance H' between the reference position P of the door panel, such as the center of hole 6' formed in the outer panel 4', and the upper edge of the trim member 11' increases by the amount L', which increase corresponds to the above-noted shift of vertical position. As a result, problems arise because the trim member 11' is mounted obliquely relative to the upper edge of the joined flanges 3' and 5', or because the trim member 11' interferes with other parts assembled around the trim member 11', such as a door glass.

When the flanges 3' and 5' are joined with the upper ends partially separated, as shown in FIGS. 10 and 11, it is difficult to insert the upper ends of the flanges 3' and 5' into the trim member 11'. Additionally, the insertion groove of the trim member 11' remains open, thus damaging the appearance of the mounted trim member 11'.

In case of a panel 101' that forms a wheel arch section for a vehicle, as shown in FIGS. 12 and 13(A) to 13(C), a flange 103' is formed by bending the panel 101' along the wheel arch section and the flange 103' is inserted into an insertion groove formed in a trim member 111'. In this case, the distance from the bend to the edge of the flange 103' tends to vary, such that the distance may be slightly larger or smaller than an ideal distance S. In the alternative, the bend angle tends to vary, such that the bend angle may be larger or smaller than an ideal angle θ. As a result, the trim member 111' cannot be mounted in a desired condition, and the appearance of the mounted trim member 111' is impaired.

For example, as shown in FIG. 13(A), a distance G' exists between the wheel arch bend and the outer edge of the trim member 111'. This distance G' is less than the ideal distance G shown in FIG. 12, because the actual flange length is less than the ideal flange length D. As shown in FIG. 13(B), the distance G" is greater than the ideal distance G, because the actual flange length is greater than the ideal flange length D. Finally, as shown in FIG. 13(C), the distance G''' is greater than the ideal distance G, because the bend angle is more acute than the ideal bend angle θ.

SUMMARY OF THE INVENTION

In view of the above-noted problems, it is an object of the present invention to provide a method for mounting a trim member on a flange of a panel, in which the trim member can be accurately mounted on the flange to produce a panel with a desired outer shape.

This object can be achieved by a method of mounting a trim member on a flange of a panel that comprises the steps of (1) preparing an extrusion molding die having (i) a supply passage for supplying a molding material that will form a trim member, (ii) an extrusion port communicating with the supply passage and (iii) an insertion slit communicating with and extending laterally from the extrusion port for receiving the panel flange, (2) inserting the panel flange into the extrusion port through the insertion slit, thereby defining a molding space that corresponds to the cross section of the trim member between the extrusion port and the flange, (3) extruding the molding material supplied by the material supply passage through the extrusion port and into the molding space, and (4) continuously moving the molding die relative to the flange, while adjusting the insertion depth of the flange into the extrusion port, such that the distance between a reference position on the panel to the trim member is maintained at a desired distance.

Further, even if the panel is a composite panel comprised of a plurality of panel sheets, the trim member is mounted on the joined flanges of the composite panel by extrusion molding in the same manner as described above.

According to the above-mentioned method of mounting a trim member on a flange of a panel, the trim member is continuously extrusion molded along the edge of the flange and is simultaneously mounted on the flange. As a result, even with a flange having a non-uniform width or a distorted edge, the trim member can be accurately mounted on the flange with a desired outer shape. Thus, it is possible to obtain a panel having a good appearance. It is also possible to prevent the trim member from falling off the panel flange, which may be caused by improper mounting of the trim member.

Further, in case of a composite panel, when the flanges of each panel sheet are joined with their position shifted in a vertical direction, or when the flanges are joined with the upper ends partially separated, the trim member can be accurately mounted on the flanges so as to have a desired outer shape. Thus, it is possible to eliminate the problem, in which the trim member is mounted obliquely relative to the upper edge of the joined flanges, or the trim member interferes with other parts assembled around the trim member, such as a door glass.

BRIEF DESCRIPTION OF THE DRAWINGS

FIG. 4(A) is a sectional view in which the trim member is mounted on the flanges joined in an ideal condition;

FIG. 4(B) is a sectional view in which the trim member is mounted on the flanges joined with their positions shifted in a vertical direction;

FIG. 5 is a perspective view in which the flanges are joined with their edges partially separated and the trim member is extrusion molded on such edges;

DETAILED DESCRIPTION OF THE INVENTION

A first embodiment of the invention will be described with reference to FIGS. 1 to 5.

Figure 1:
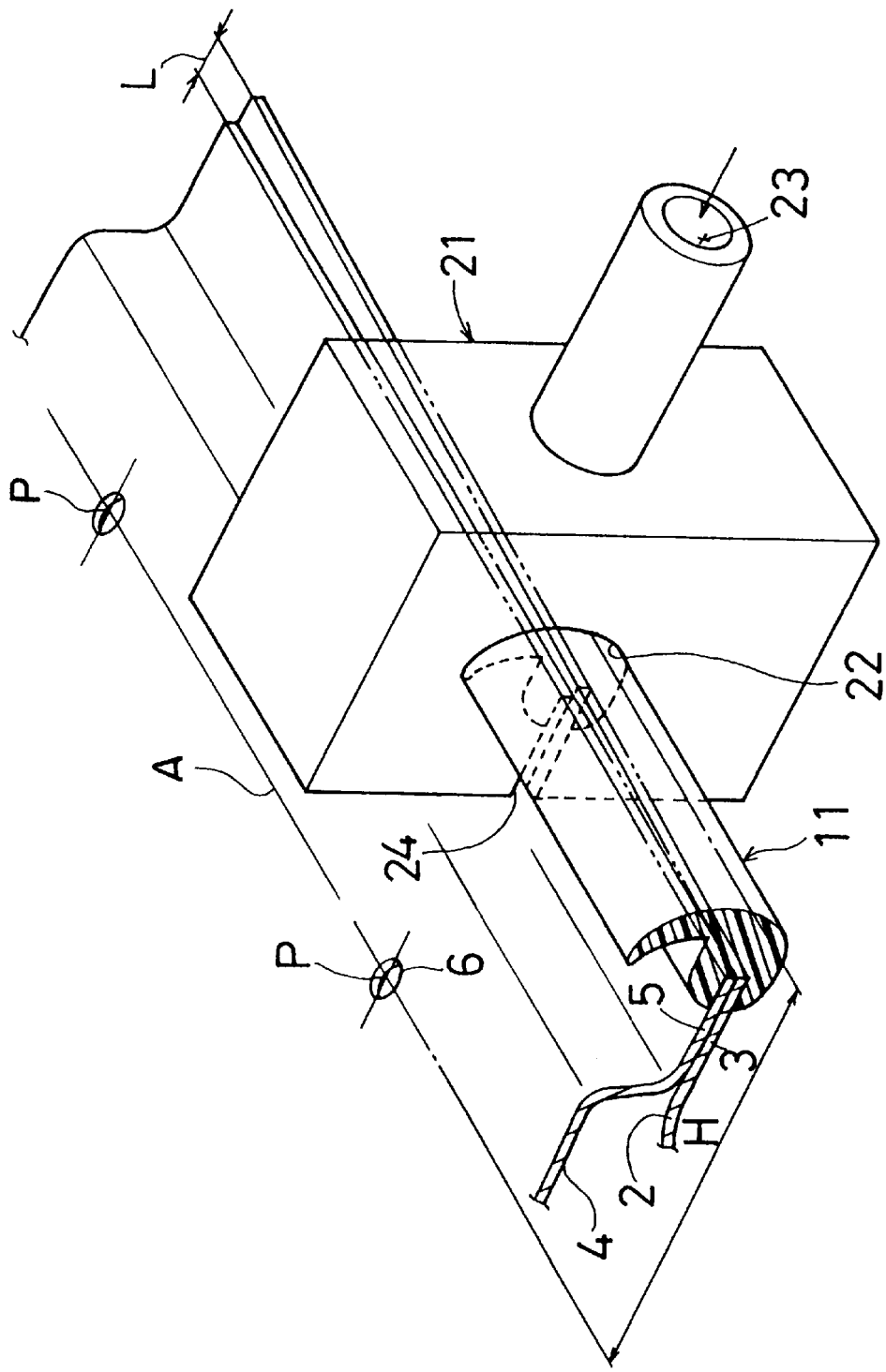
FIG. 1 is a perspective view of a first embodiment of the invention in which a trim member is extrusion molded and is simultaneously mounted on the edge of joined flanges of a door panel.

Panel unit 1 is constructed as a composite of a door panel for a vehicle and having a trim member 11 integrally mounted on the door panel. As shown in FIG. 3, a first flange 3 is formed on the upper edge of an inner panel 2 and a second flange 5 formed on the upper edge of an outer panel 4 and the flanges are joined by spot welding. The trim member 11, which has a cross section as shown in FIG. 1 and is made of synthetic resin, rubber or the like, is extrusion molded on the upper ends of the joined first flange 3 and second flange 5 and is simultaneously mounted thereon in such a manner as to completely cover the upper ends of the flanges. As will be inherently understood by the use of the extrusion molding process described in detail herein and the embodiments shown in FIGS. 1–7, the trim member is a solid member and is flush with the flange portions. That is, because the trim member is in situ molded onto the flanges, no gaps or spaces form between the trim member and the flanges, regardless of the shape or position of the flanges.

Figure 2:
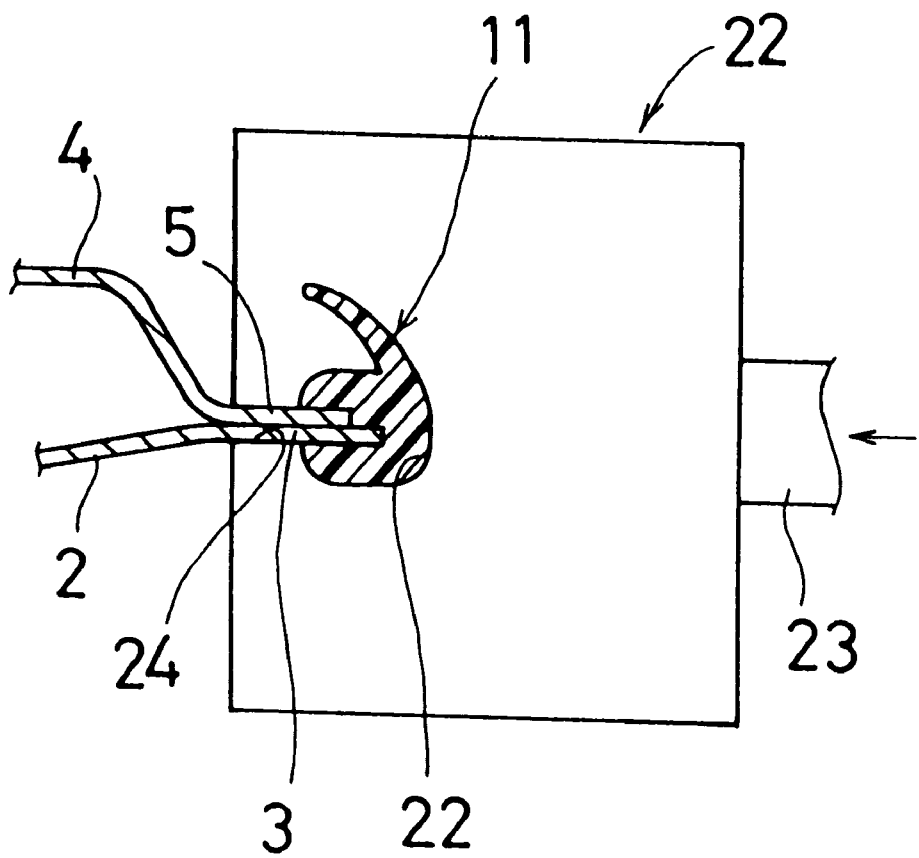
FIG. 2 is a front view of an extrusion molding die of the first embodiment.
Figure 3:
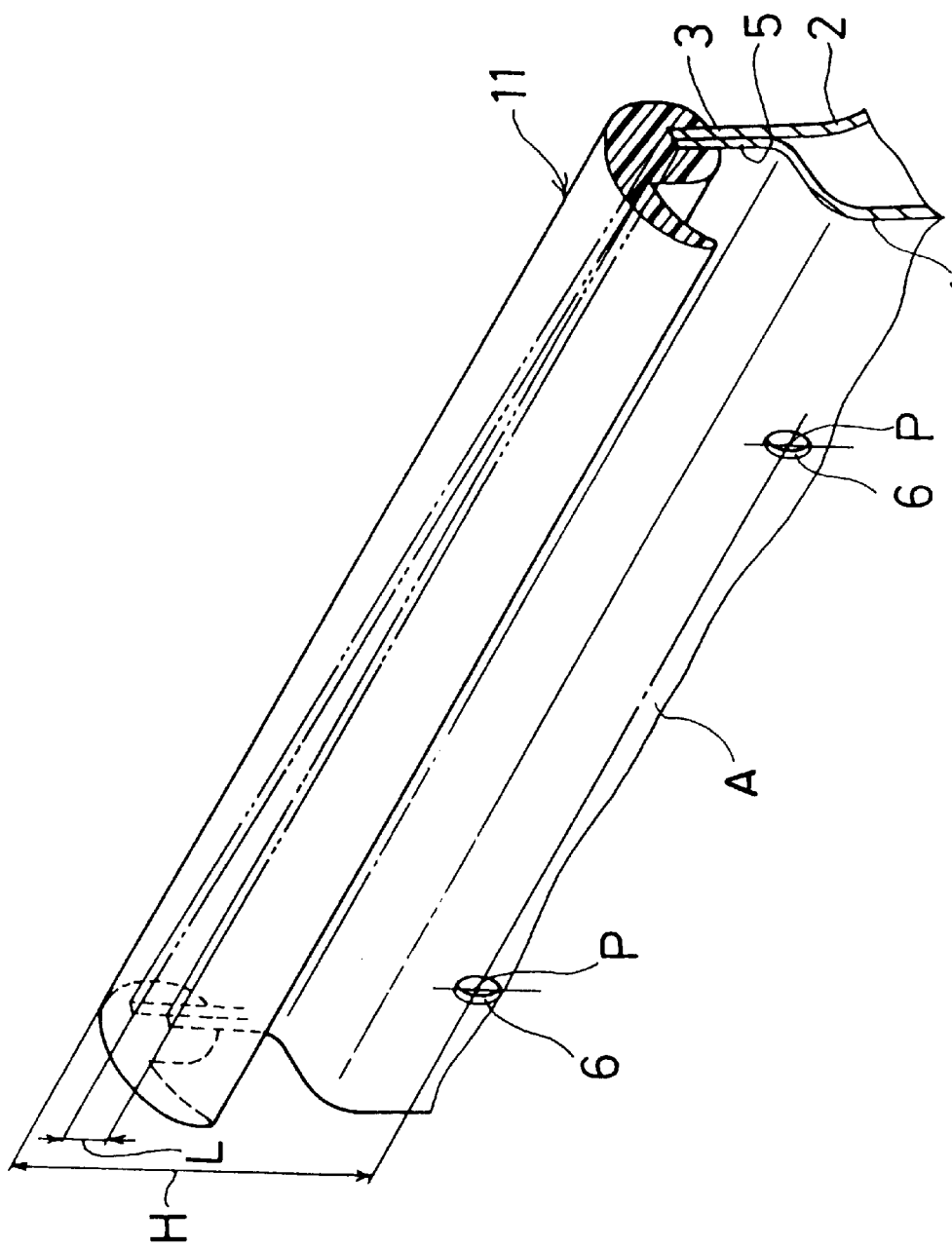
FIG. 3 is a perspective view in which the trim member is mounted on the upper ends of the joined flanges of the door panel of the first embodiment.
Figure 6:
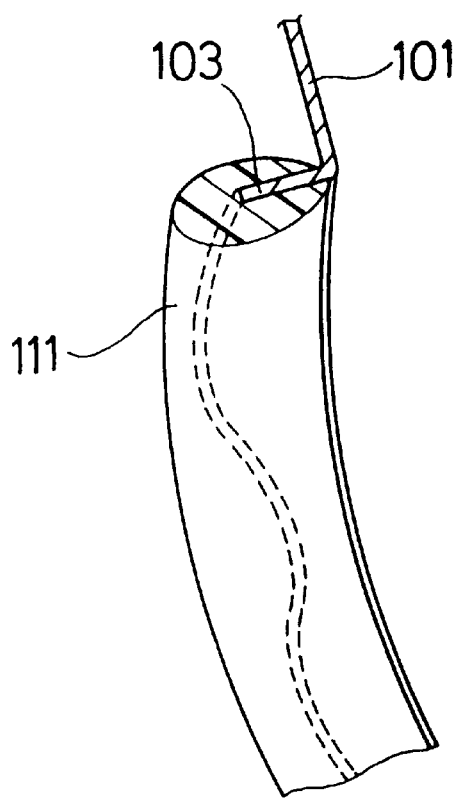
FIG. 6 is a perspective view in which a trim member is mounted on a flange of a wheel arch panel of a second embodiment.

As shown in FIGS. 1 and 2, a die 21 for extrusion molding the trim member 11 has an extrusion port 22 opening in the front face thereof and communicating with a molding material supply passage 23, which in turn communicates with an extruder. Further, the die 21 has an insertion slit 24 communicating with the extrusion port 22 for receiving the joined flanges 3 and 5. The insertion slit 24 extends from the front face to the rear face of the die 21. A molding space having a cross section corresponding to the desired trim member 11 is defined by the inner peripheral surface of the extrusion port 22 and around the joined flanges 3 and 5 that have been inserted through the insertion slit 24 into the extrusion port 22.

Further, the insertion depth of the second flange 5 into the extrusion port 22 is controlled such that the desired distance H is maintained between a reference line on the door panel, such as a line A drawn through the centers of holes 6 formed in the outer panel 4 as shown in FIG. 3, and the upper edge of the trim member 11 mounted on the upper end of the second flange 5, even if the flanges are not evenly joined.

When the flanges 3 and 5 are inserted into the insertion slit 24 of the die 21 and into the extrusion port 22, molding material is extruded from the extruder through the material supply passage 23 and is supplied into the molding space. The trim member 11 is formed in the molding space. The molded trim member 11 is then extruded forwardly of the extrusion port 22.

While extrusion molding the trim member 11, the die 21 and the joined flanges 3 and 5 are moved relative to each other at a speed equal to the extrusion speed of the molding material. At the same time, the insertion depth of the second flange 5 into the extrusion port 22 is adjusted such that the distance H from the reference line of the outer panel 4 (i.e. the line A drawn through the centers of holes 6 as shown in FIG. 3) to the upper edge of the trim member 11 is maintained at a constant distance. Thus, the trim member 11 is continuously extrusion molded along the edge of the joined flanges 3 and 5 from one end thereof toward the other end and is simultaneously mounted on the edge of the joined flanges 3 and 5.

By thus extrusion molding the trim member 11 along the edge of the joined flanges 3 and 5 of the door panel 1 and simultaneously mounting the trim member 11 thereon, even if the joined flanges 3 and 5 are shifted in a vertical direction by the amount L as shown in FIGS. 3, 4(A) and 4(B), the distance from the reference line A of the outer panel 4 to the upper edge of the trim member 11 is maintained at the desired distance H. As a result, the trim member 11 is accurately mounted on the edges of the joined flanges 3 and 5, thereby forming a panel having a desired outer shape.

Further, even when the flange 3 of the inner panel 2 and the flange 5 of the outer panel 4 are joined with the upper ends partially separated, as shown in FIG. 5, the trim member 11 is accurately mounted with the desired outer shape and is not influenced by such partial separation, because the trim member 11 is extrusion molded on the edge of the joined flanges 3 and 5 and is simultaneously mounted thereon as described above.

Although the first embodiment describes a door panel for a vehicle that is a composite panel, the door panel is not limited to the above composite plate.

A second embodiment of the invention will be described with reference to FIGS. 6 and 7(A) to 7(C). According to the second embodiment, panel 101 has a wheel arch section for a vehicle. The panel 101 has a flange 103 formed by press bending along the wheel arch section.

A trim member 111 made of synthetic resin, rubber or the like is extrusion molded and simultaneously mounted on the flange 103 so as to cover the flange 103, in substantially the same manner as in the first embodiment.

In the second embodiment, the bend of the flange 103 of the panel 101 is utilized as a reference. While extrusion molding the trim member 111, the die and the flange 103 are moved relative to each other with the angle of the panel surface with respect to the die maintained at a desired angle. At the same time, the insertion depth of the flange 103 into the extrusion port of the die is adjusted such that the distance G from the reference to the upper edge of the trim member 111 is maintained constant. Thus, the trim member 111 is continuously extrusion molded along the flange 103 and is simultaneously mounted thereon.

Figures 7A, 7B, 7C:
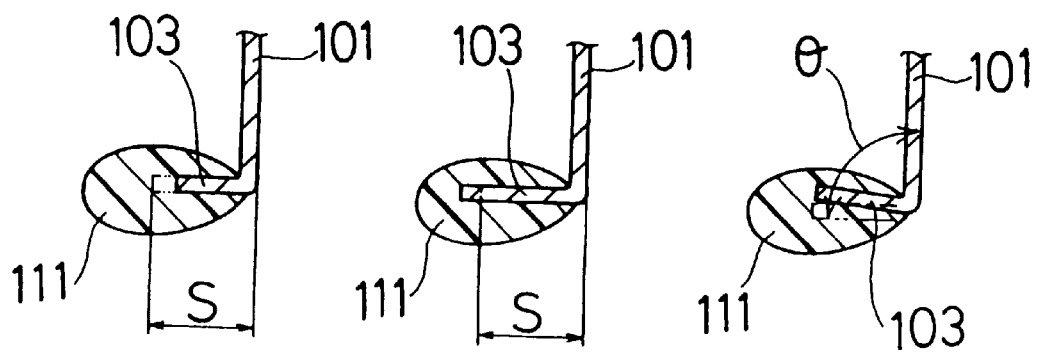
FIG. 7(A) is a sectional view in which the width of the flange of the second embodiment is shorter than a set length and the trim member is mounted on the shorter part of the flange.
FIG. 7(B) is a sectional view in which the width of the flange of the second embodiment is longer than a set length and the trim member is mounted on the longer part of the flange.
FIG. 7(C) is a sectional view in which the flange of the second embodiment is bent at an angle less than a set angle and the trim member is mounted on the smaller-angle part of the flange.
Figure 8:
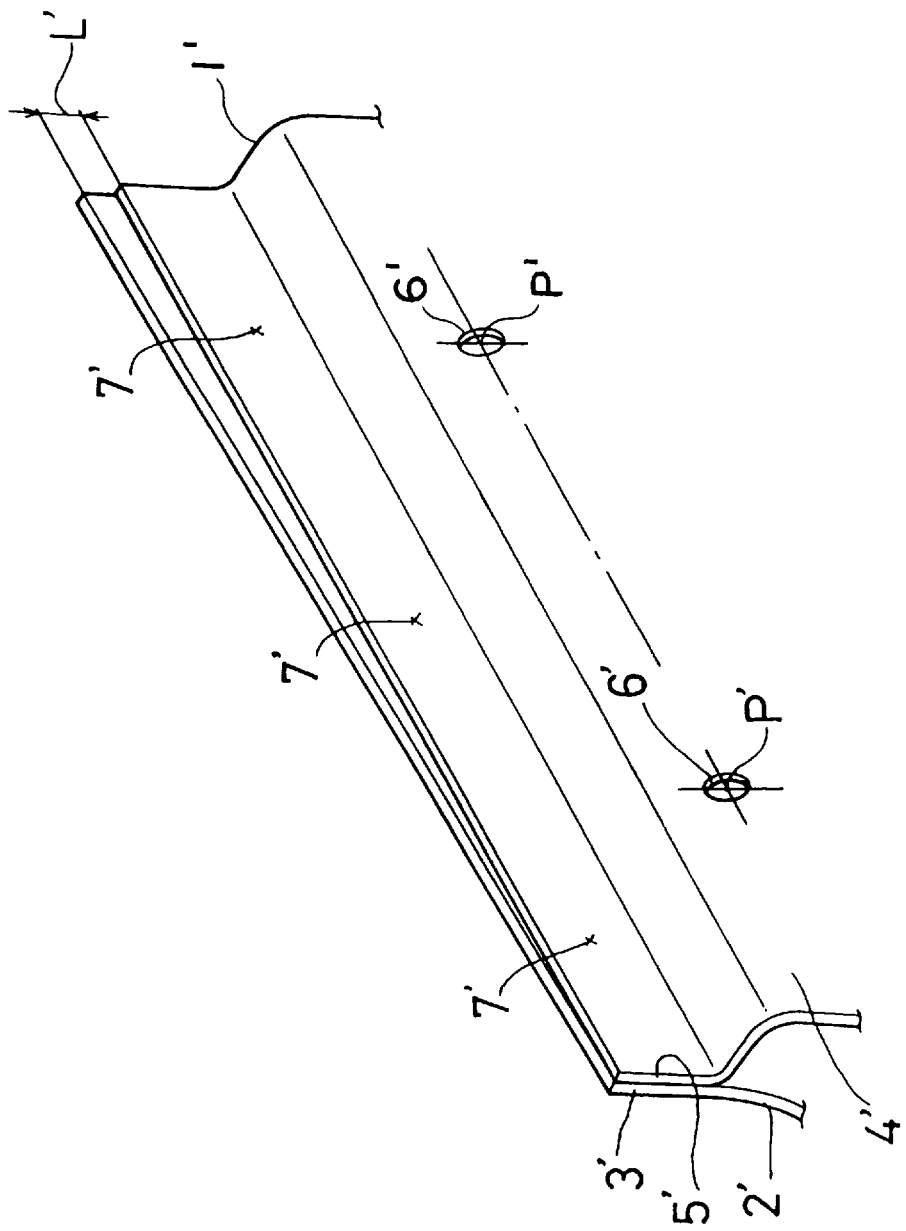
FIG. 8 is a perspective view in which flanges of a known door panel are joined with their positions shifted in a vertical direction.
Figure 9A:
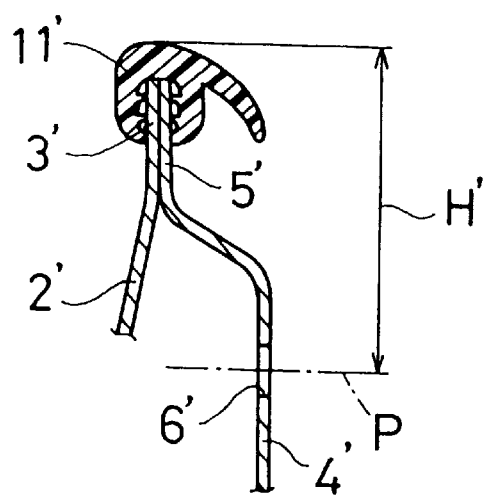
FIG. 9(A) is a sectional view in which the trim member is mounted on the flanges of the known door panel joined in and ideal condition.
Figure 9B:
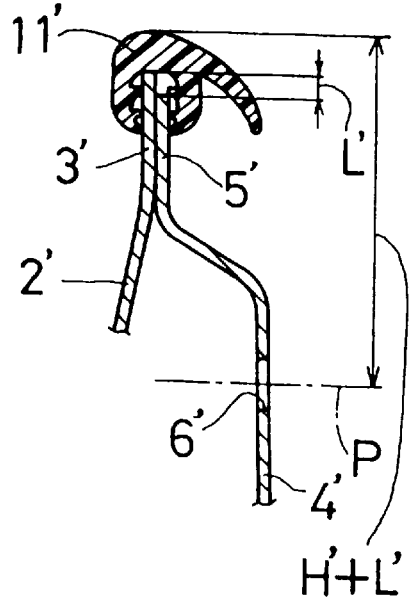
FIG. 9(B) is a sectional view in which the trim member is mounted on the flanges of the known door panel joined with their positions shifted in a vertical direction.
Figure 10:
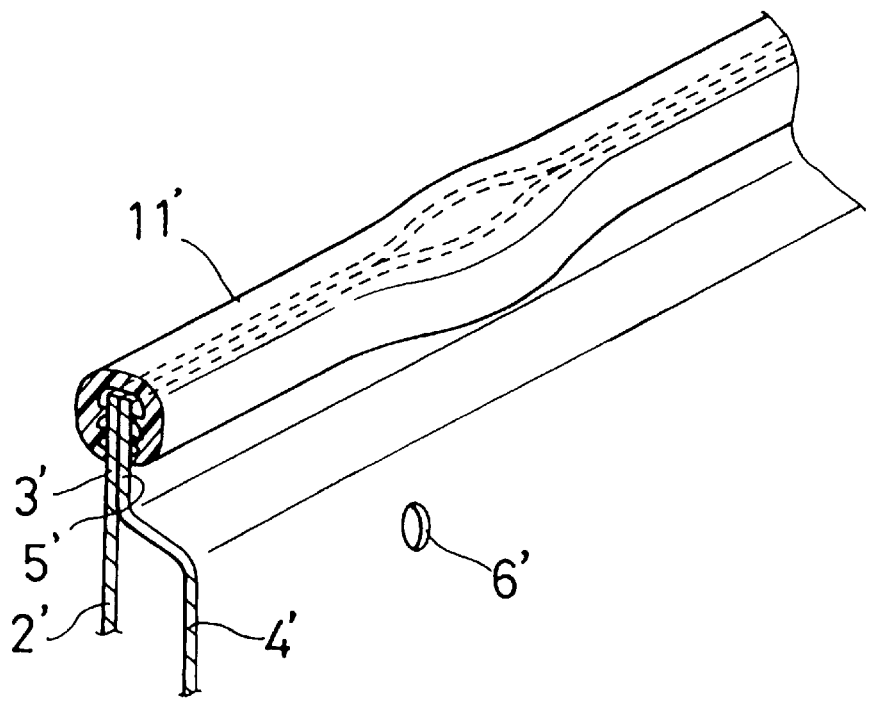
FIG. 10 is a perspective view in which the flanges of the known door panel are joined with their edges partially separated and the trim member is extrusion molded on such edges.
Figure 11:
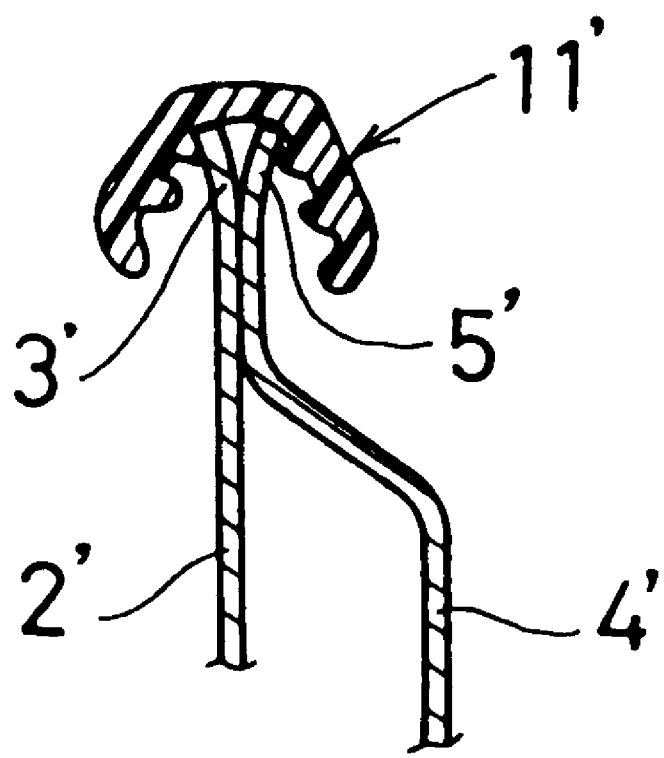
FIG. 11 is a sectional view of the known door panel in which the trim member is mounted on the open edges of the flanges.
Figure 12:
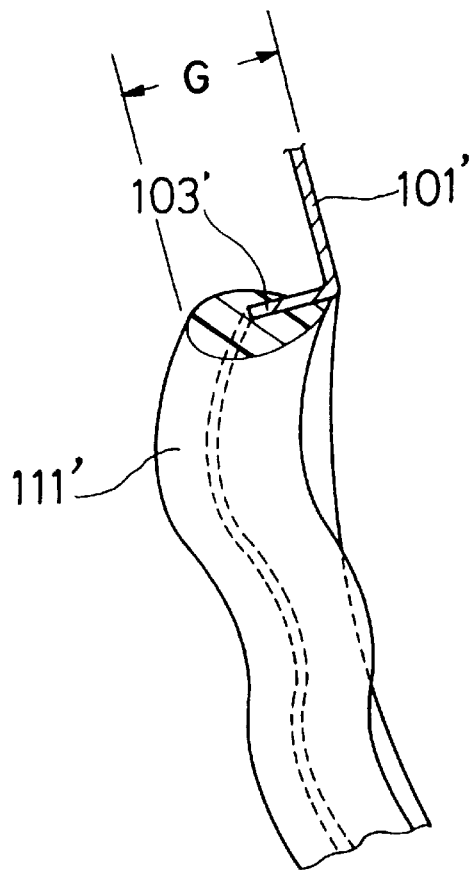
FIG. 12 is a perspective view in which the trim member is mounted on a flange of a known wheel arch panel.
Figures 13A, 13B, 13C:
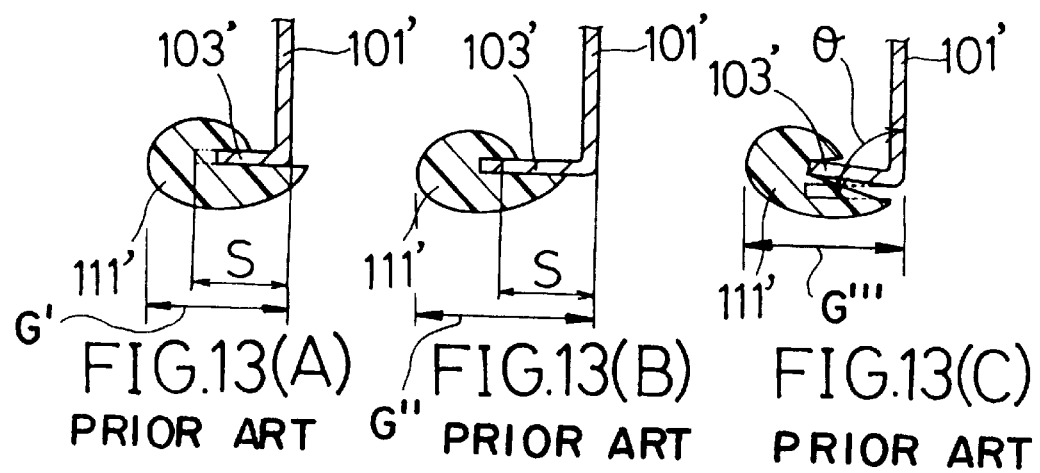
FIG. 13(A) is a sectional view in which the width of the flange of the known wheel arch panel is less than a set length and the trim member is mounted on the shorter portion of the flange.
FIG. 13(B) is a sectional view in which the width of the flange of the known wheel arch panel is greater than a set length and the trim member is mounted on the longer portion of the flange.
FIG. 13(C) is a sectional view in which the flange of the known wheel arch panel is bent at an angle less than a set angle and the trim member is mounted on the smaller-angle portion of the flange.

Thus, even when the distances from the outer panel wall to the edge of the flange 103 is longer or shorter than the ideal distance S, or when the bend angle of the flange 103 is larger or smaller than and ideal angle θ, the trim member 111 is mounted on the flange 103 with a good appearance and in a desired condition. For example, as shown in FIGS. 7(A) to 7(C), the distance G remains constant, even though the flange length differs from the ideal flange length S or the bend angle differs from the ideal bend angle θ.

Although the second embodiment utilizes a panel 101 having a wheel arch section for a vehicle as the panel, the invention is not limited to the above embodiments.

What is claimed is:

1. A panel unit comprising:
   a panel having a flange with a non-uniform outer dimension, the panel having first and second reference points at an interior portion of the panel and a reference line which extends through the reference points, said reference line being substantially parallel to an outer edge of the flange; and
   an extrusion molded trim member integrally molded to the non-uniform outer dimension of the panel flange having an upper edge that is a constant distance from the reference line along an entire length of the panel, the extrusion molded trim member being a solid resin material, such that no cavities are formed within the extrusion molded trim member.

2. A panel unit as defined in claim 1 wherein the panel flange has a distorted outer edge and the extrusion molded trim member has an inner cross section that corresponds to the panel flange distorted outer edge.

3. A panel unit as defined in claim 1 wherein the panel is a vehicle door panel having two holes and the reference line extends through the center of the holes.

4. A panel unit comprising:
   a panel having a flange with a non-uniform outer dimension, the panel having a reference line formed along a bend line between the flange and the panel, the reference line being curved; and
   an extrusion molded trim member integrally molded onto the non-uniform outer dimension of the panel flange having an upper edge that is a constant distance from the reference line along the entire length of the panel, the extrusion molded trim member being a solid resin material, such that no cavities are formed within the extrusion molded trim member.

5. A panel unit as defined in claim 4 wherein the panel is a vehicle wheel arch section and the reference line is an outer wall of the panel.

6. A panel unit comprising:
   a panel having a bent flange with a non-uniform outer dimension, the panel having an outer wall defining a reference line, said reference line being substantially parallel to said bent flange; and
   an extrusion molded trim member integrally molded to the non-uniform outer dimension of the panel flange having a uniform outer dimension with respect to said reference line on the panel along an entire length of the panel, even though the panel flange has a non-uniform outer dimension, the extrusion molded trim member being a solid resin material, such that no cavities are formed between the outer surface of the extrusion molded trim member and the panel flange.

7. A panel unit as defined in claim 6 wherein the panel is a vehicle wheel arch section.

8. A plurality of panel units comprising:
   a plurality of panels, each having a flange, the plurality of panel flanges having non-uniform outer dimensions, wherein an extrusion molded trim member is integrally molded to the non-uniform outer dimension of each panel flange and each of the plurality of extrusion molded trim members has a uniform outer dimension when mounted on the panels, each extrusion molded trim member being a solid resin material, such that no cavities are formed between the outer surface of the extrusion molded trim member and the panel flange.

9. A plurality of panel units as defined in claim 8 wherein the panel flanges are wheel arch section panel flanges.

10. A plurality of panel units as defined in claim 8 wherein the panel flanges are vehicle door panel flanges.

* * * * *